United States Patent
Liu (10) Patent No.: US 8,736,659 B2
(45) Date of Patent: May 27, 2014

(54) METHOD, APPARATUS, AND SYSTEM FOR 3D VIDEO COMMUNICATION

(71) Applicant: Huawei Device Co., Ltd., Guangdong (CN)

(72) Inventor: Yuan Liu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 99 days.

(21) Appl. No.: 13/630,110

(22) Filed: Sep. 28, 2012

(65) Prior Publication Data

US 2013/0021429 A1  Jan. 24, 2013

Related U.S. Application Data

(63) Continuation of application No. 12/953,790, filed on Nov. 24, 2010, now Pat. No. 8,456,505, which is a continuation of application No. PCT/CN2009/071546, filed on Apr. 29, 2009.

(51) Int. Cl.
*H04N 7/14* (2006.01)

(52) U.S. Cl.
CPC ............................... *H04N 7/14* (2013.01)
USPC .................. 348/14.07; 348/14.08; 348/14.09

(58) Field of Classification Search
CPC ......... H04N 7/14; H04N 7/147; H04N 7/152; H04N 13/0456; H04N 13/0239; H04N 13/0454; H04N 13/0003
USPC .................... 348/14.01–14.16; 370/260–261; 709/204–205

See application file for complete search history.

(56) References Cited

U.S. PATENT DOCUMENTS

| 2003/0035001 | A1 | 2/2003 | Van Geest |
| 2004/0150767 | A1* | 8/2004 | Kim ............................. 349/74 |
| 2005/0259148 | A1 | 11/2005 | Kubara |
| 2006/0200518 | A1* | 9/2006 | Sinclair et al. ............... 709/204 |

FOREIGN PATENT DOCUMENTS

| CN | 1541485 A | 10/2004 |
| CN | 101291415 A | 10/2008 |
| EP | 0860807 A2 | 8/1998 |
| EP | 0953962 A3 | 11/1999 |
| EP | 1566974 A1 | 8/2005 |
| JP | 6113336 A | 4/1994 |
| JP | 06113336 A * | 4/1994 |
| WO | 2007047685 A2 | 4/2007 |

OTHER PUBLICATIONS

First office action issued in corresponding European patent application No. 09753453.1, dated Jul. 26, 2013, total 7 pages.
3GPP TSG-SA WG2 Meeting #65 S2-084442,"Mapping between S-TMSI and P-TMSI", Ericsson, Prague, Czech Republic, May 12-16, 2008, total 3 pages.

(Continued)

*Primary Examiner* — Melur Ramakrishnaiah
(74) *Attorney, Agent, or Firm* — Huawei Device Co., Ltd.

(57) ABSTRACT

A three-dimensional (3D) video communication method includes receiving video information of at least two session parties, wherein the video information of at least one session party is 3D video information. The video information received from the at least two session parties is processed according to state information of the at least two session parties and display capabilities of a terminal.

15 Claims, 7 Drawing Sheets

(56) References Cited

OTHER PUBLICATIONS

Office action issued in corresponding to CN application No. 2008100983553,dated Jun. 19, 2009, and an English translation thereof, total 18 pages.
Search report issued in corresponding to EP application No. 09753453.1, dated Jul. 18, 2011, total 11 pages.
International search report and Written opinion issued in corresponding to PCT application No. PCT/CN2009/071546, dated Aug. 6, 2009, total 8 pages.
Open IPTV Forum—Functional Architecture —V 1.1, Approved Jan. 15, 2008, total 141 pages.

* cited by examiner

| 3D video image (current session party) | 2D video image |
|---|---|
| 2D video image | 2D video image |

| 3D video image (session party 1) | 2D video image (session party 2) |
|---|---|
| 2D video image (session party 3) | 3D video image (session party 4) |

METHOD, APPARATUS, AND SYSTEM FOR 3D VIDEO COMMUNICATION

CROSS-REFERENCE TO RELATED APPLICATION

This application is a continuation of U.S. patent application Ser. No. 12/953,790, filed on Nov. 24, 2010, which is a continuation of co-pending International Application No. PCT/CN2009/071546, filed on Apr. 29, 2009, which designated the United States and was not published in English, and which claims priority to Chinese Application No. 200810098355.3, filed on May 30, 2008, all of which applications are incorporated herein by reference.

TECHNICAL FIELD

The present invention relates to video communication technologies, and in particular embodiments, to a method, an apparatus, and a system for 3-dimensional (3D) video communication.

BACKGROUND

The traditional video image is a 2-dimensional (2D) information medium, which renders only the content of the scene but ignores the depth information such as the distance and location of the object. Therefore, the traditional 2D video image is incomplete. People are accustomed to observing things binocularly, and therefore, more information than a 2D picture is required for people to obtain necessary spatial information. The 3D video technology provides the pictures which comply with 3D visual principles and bear depth information, reconstructs the physical object authentically, renders the scene with the feelings of depth, perspective and reality, and is a trend of the video technology. The development of the 3D video technology began in the 1980s, but the technology has not been applied massively due to technical immaturity, high cost of the display device and lack of standardization. In recent years, with the perfection of the relevant technologies, plunge of the device cost, and launch of the relevant standards, the 3D video technology is put into practical use, and 3D video communication becomes a hot issue in the 3D video research field.

The prior art discloses a 3D videoconference workstation. The workstation includes a dual video camera for capturing video signals and a depth image calculation apparatus for creating a depth image. The video signals and the depth information are transmitted as 3D video data. Besides, the workstation includes a 3D display device for displaying 3D images. The depth image calculation apparatus can estimate the location of the user, and is configured to exercise control for generating 3D images.

The prior art also discloses a 3D image communication terminal for displaying 3D image information. The terminal includes a 3D image input module with multiple cameras for capturing 3D images; a 3D image display module, configured to display 3D image information; and a communication module, configured to transmit at least the 3D image information obtained by the 3D image input module. The 3D image display module is composed of a horizontal/vertical parallax display device that integrates imaging types. The cameras are arranged in at least from top downward and from left rightward near the 3D image display device.

In the process of developing the present invention, the inventor finds at least these defects in the prior art. The 3D video communication is capable of only peer-to-peer communication and displaying the 3D video image of a single party, and is not capable of performing multi-party 3D video communication. Therefore, with the rapid development of the communication technology, the implementation of the 3D multi-party video communication or 2D/3D hybrid multi-party video communication has become an urgent requirement.

SUMMARY OF THE INVENTION

The embodiments of the present invention provide a method, an apparatus and a system for 3D video communication for implementing multi-party 3D video communication or 2D/3D hybrid multi-party video communication.

The technical solution under the present invention is implemented in the following way.

A 3D video communication method provided in an embodiment of the present invention includes receiving video information of at least two session parties, where the video information of at least one session party is 3D video information. The video information received from the at least two session parties is processed according to state information of the at least two session parties and display capabilities of a terminal.

A 3D video communication system provided in an embodiment of the present invention includes at least two session parties that are configured to send video information to the video communication terminal, where the video information of at least one session party is 3D video information. A video communication terminal is configured to receive video information of at least two session parties, and to process the video information received from the at least two session parties according to state information of the at least two session parties and display capabilities of the terminal.

A 3D video communication system provided in an embodiment of the present invention includes a Multi-point Control Unit (MCU) that is configured to receive video information of at least two session parties. The video information of at least one session party is 3D video information. The video information received from the at least two session parties is processed according to state information of the at least two session parties and display capabilities of the terminal and the processed video information is obtained. A video communication terminal is configured to acquire and display the processed video information.

A 3D video communication apparatus provided in an embodiment of the present invention includes a receiving module that is configured to obtain video information and state information of at least two session parties as well as display capabilities of a terminal, where the video information of at least one session party is 3D video information. A processing module is configured to process the video information received from the at least two session parties according to the state information of the at least two session parties and the display capabilities of the terminal.

Through the method, the apparatus, and the system for 3D video communication provided in embodiments of the present invention, a terminal capable of displaying 3D images receives video information of at least two session parties, and displays the video information received from each session party in a 3D or 2D way, thus implementing multi-party 3D video communication or 2D/3D hybrid multi-party video communication. Therefore, the user can perform 3D video communication with multiple session parties simultaneously, and obtain better experience in the 3D video communication.

DETAILED DESCRIPTION OF THE INVENTION

In order to make the technical solution, objectives, and merits of the present invention clearer, the following describes the present invention in more details with reference to accompanying drawings and preferred embodiments.

The 3D video communication simulates the human vision, and uses cameras to capture a left-eye image and a right-eye image. As a result, when a person watches a 3D video, the left eye sees the left-eye image and the right eye sees the right-eye image. Therefore, the person sees stereoscopic images and perceives the depth of the scene. The 3D video images are categorized into left-eye images and right-eye images, and parallax exists between the two types of images.

Figure 1:
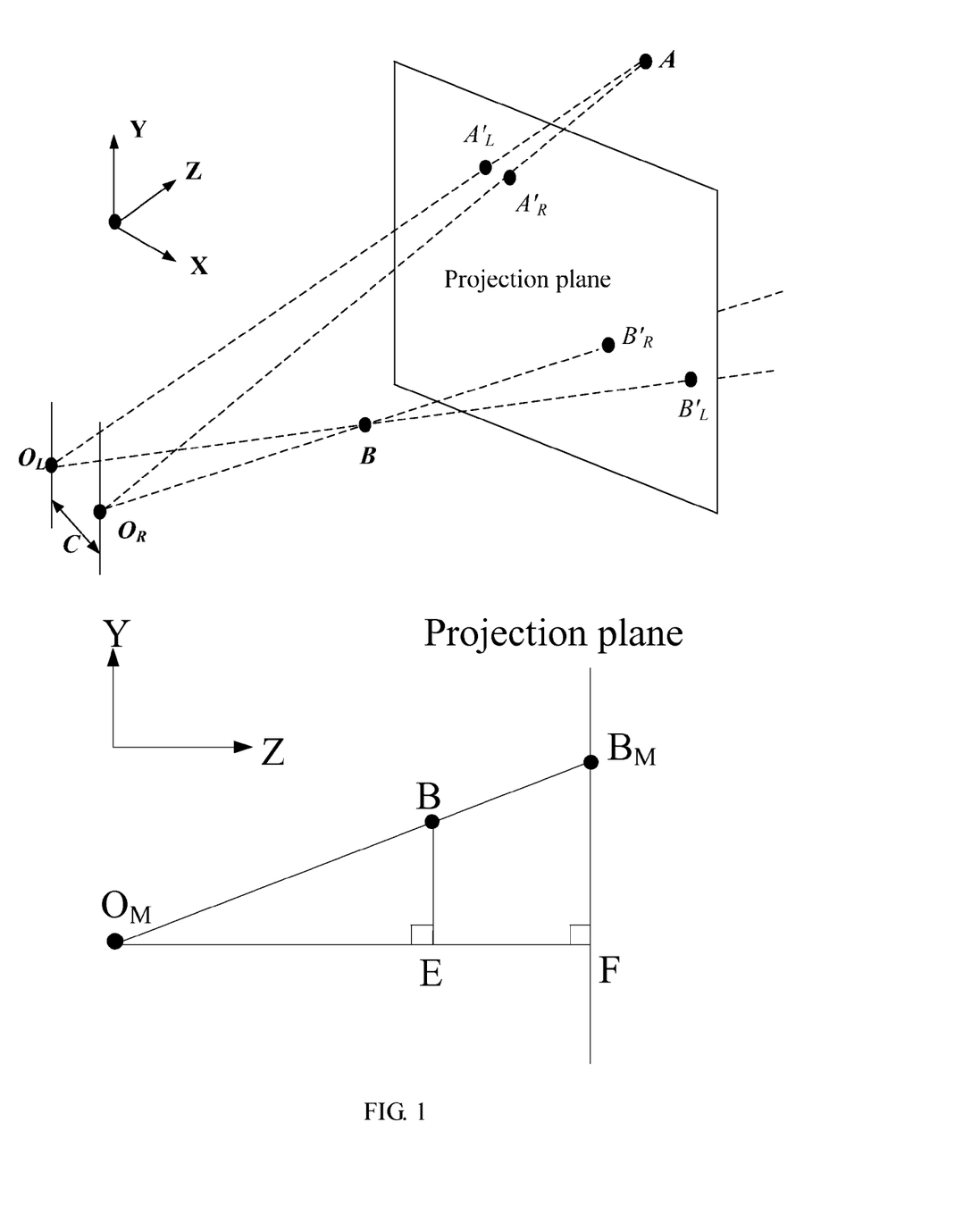
FIG. 1 shows basic principles of 3D video in an embodiment of the present invention.

As shown in FIG. 1, a parallel dual camera system is applied in an embodiment of the present invention. In the left part of FIG. 1, A and B are two points in an actual scene, $O_L$ and $O_R$ are the optical centers of the left camera and the right camera respectively, and the distance between $O_L$ and $O_R$ is C. In this case, a parallel camera system is applied, namely, the line that connects $O_L$ and $O_R$ is parallel to the projection plane and to the ground. The distances from the optical centers of the two cameras to the projection plane are both f, namely, the focal lengths of the cameras are both f. $A'_L$ and $A'_R$ are projections of A on the projection plane with respect to the left camera and the right camera respectively; $B'_L$ and $B'_R$ are projections of B on the projection plane with respect to the left camera and the right camera respectively. As shown in the right part of FIG. 1, supposing that there exists a camera the optical center $O_M$ of which falls on the midpoint of the line between $O_L$ and $O_R$, the projection B on the projection plane with respect to the camera $O_M$ is $B_M$. In this case, appointing $O_M$ as a coordinate origin, supposing the spatial coordinates of B to be (x, y, z), by observing the projection of B on the projection plane with respect to the camera $O_M$ from a perspective of the Y-Z plane, the geometric relation shown in the right part of FIG. 1 can be obtained. In the right part of FIG. 1, supposing that the vertical line from $O_M$ to the projection plane intersects the projection plane at F, the distance between $O_M$ and F is f, namely, $O_M F$=f; supposing that the vertical line from B to $O_M F$ intersects $O_M F$ at E, BE=y and $O_M E$ =z. Because the triangle $O_M EB$ is similar to the triangle $O_M FB_M$, the following formulas are inferred:

$$\frac{B_M F}{BE} = \frac{O_M F}{O_M E} \Rightarrow \frac{B_M F}{y} = \frac{f}{z} \Rightarrow B_M F = \frac{yf}{z} \quad (1)$$

According to formula (1) and FIG. 1, the length value of $B_M F$ is the Y-axis coordinate of the projection point $B_M$ on the projection plane. Likewise, the X-axis coordinate of $B_M$ on the projection plane can be deduced. If X-axis and Y-axis coordinates of $B_M$ on the projection plane are represented by u and v respectively, the following formula applies:

$$\begin{bmatrix} u \\ v \end{bmatrix} = \begin{bmatrix} \frac{xf}{z} \\ \frac{yf}{z} \end{bmatrix} \quad (2)$$

The camera $O_L$ deviates from the camera $O_M$ by $-c/2$ on the X axis, and the camera $O_R$ deviates from the camera $O_M$ on the X axis by $+c/2$. Therefore, for a point X(x, y, z), the following formulas reflect the X-axis coordinate $u_L$ and the Y-axis coordinate $v_L$ of the projection of X on the projection plane with respect to the camera $O_L$, and reflect the X-axis coordinate $u_R$ and the Y-axis coordinate $v_R$ of the projection of X on the projection plane with respect to the camera $O_R$:

$$\begin{bmatrix} u_L \\ v_L \end{bmatrix} = \begin{bmatrix} \frac{\left(x+\frac{c}{2}\right)f}{z} \\ \frac{yf}{z} \end{bmatrix} \quad (3)$$

$$\begin{bmatrix} u_R \\ v_R \end{bmatrix} = \begin{bmatrix} \frac{\left(x-\frac{c}{2}\right)f}{z} \\ \frac{yf}{z} \end{bmatrix}$$

Due to the parallel camera system, the distance between a point in one image and its counterpart in the other image in the vertical (Y-axis) direction can be deemed as 0, and the distance between the point and its counterpart just exists in the horizontal direction, as expressed below:

$$\begin{cases} u_L - u_R = \frac{cf}{z} \\ v_L - v_R \approx 0 \end{cases} \quad (4)$$

As we can see, a parallax in the horizontal direction exists between the generated left-eye image and right-eye image. The parallax is related to the depth of the imaging point in the scene. Therefore, the parallax is convertible into the depth, and verse versa.

Compared with the 2D video, the 3D video involves more data, and the massively increased data is difficult to store and transmit. Therefore, the redundant data in the 3D video data needs to be eliminated as far as possible. Currently, the data redundancy of the 3D video data in the space domain and the time domain can be eliminated through intra-frame prediction and inter-frame prediction, and the space-domain data redundancy of the 3D video data needs to be eliminated between the left-eye image and the right-eye image. Therefore, parallax/depth estimation compensation technology for eliminating the space domain redundancy between the left-eye image and the right-eye image becomes a key technology in the 3D video coding. Similar to the motion estimation compensation technology, the parallax/depth estimation compensation technology uses the relevance between two or more images to eliminate the space-domain data redundancy between the images. The parallax/depth information is generally obtained through stereoscopic matching for the left-eye image and the right-eye image.

The image on the left side is a left-eye image, and the image on the right side is a parallax map. If luminance information used to express the disparity information of each pixel point in the image, the parallax of the image area closer to the observer is larger, and the luminance of such image area is higher; the parallax of the image area farther away from the observer is smaller, and the luminance of such image area is lower. Therefore, according to the relation between the parallax and the depth, a parallax map can be easily converted into a depth map. A right-eye image can be derived from a left-eye image according to the parallax/depth information (the basic conversion method is that a pixel in the left-eye image is added to a parallax offset to obtain the corresponding pixel in the right-eye image). Through the foregoing technology, the transmission of the data information in the right-eye image is avoided or reduced, and the coding efficiency is improved. Moreover, with the depth information in the shot scene, the image of a viewpoint where a virtual camera is placed can be generated according to a camera imaging model, and the user can see the image of the scene of a viewpoint where no camera is placed. Therefore, when the user watches a stereoscopic image through an automatic stereoscopic display, the parallax never changes due to change of the location and the stereoscopic image never changes in the eyes of the observer, and thus the user can see appropriate 3D images in different locations.

Figure 2:
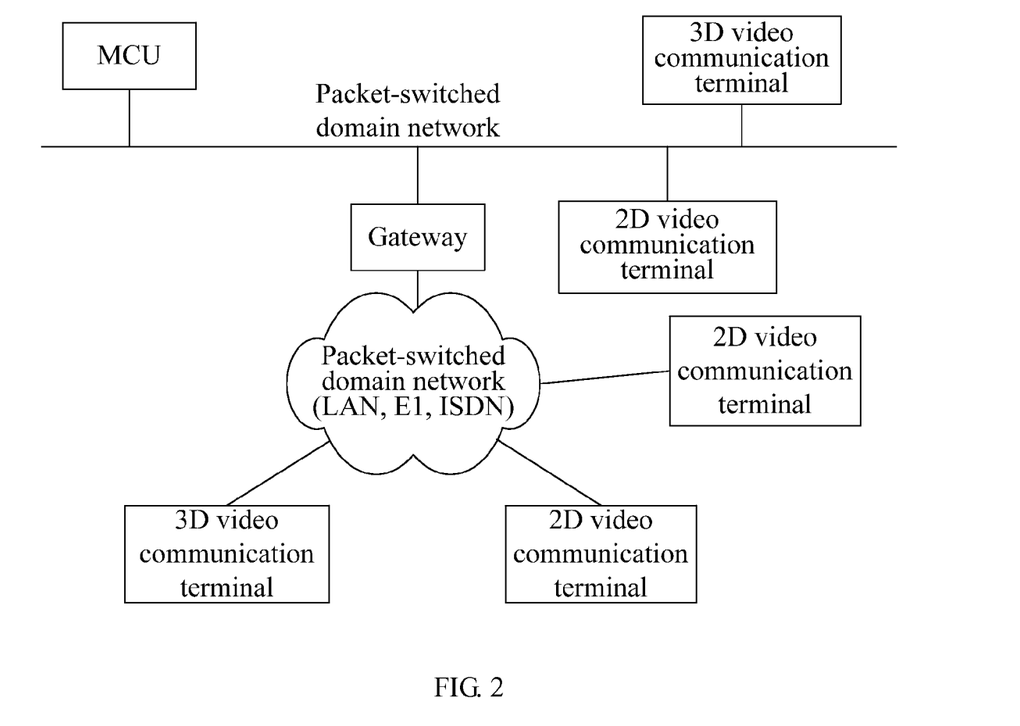
FIG. 2 shows a network structure of a 3D video communication system in an embodiment of the present invention.

As shown in FIG. 2, in this embodiment, the video communication system may be set up in a packet-switched domain network such as Local Area Network (LAN), narrowband Integrated Service Digital Network (ISDN), and broadband ISDN or El, and is composed of gateways, an MCU, 2D video communication terminals, 3D video communication terminals and other devices. The gateway enables real-time bidirectional communication with a terminal in the packet-switched domain network or another gateway. The MCU is a node in a network, which enables multi-party video communication (for example, multi-point conference) for three or more terminals and the gateways. The MCU can also connect two terminals to perform point-to-point video communication, which is then extended to multi-party video communication. The MCU may include a Multi-point Controller (MC) and a Multi-point Processor (MP). The MC provides the control function for the multi-party video communication, and can perform capability negotiation with the terminals and control the conference resources. Under control of the MC, the MP performs centralized processing (such as mixing and switching) for the audio, video and/or data streams in the multi-party video communication. The 2D video communication terminal is capable of only processing and displaying 2D images. For example, the 2D video communication terminal is a videophone, videoconference terminal, or personal computer video communication terminal. The 3D video communication terminal is capable of processing and displaying 3D images.

In the foregoing network structure, before a terminal initiates a video communication session, the terminal negotiates capabilities with the peer through the terminal or the MC. If both parties are 3D video communication systems, both parties can see the real-time 3D video images. If one party is a 2D video terminal, which does not fulfill conditions of the 3D video communication, the 2D video communication is performed between both parties.

The 3D video communication terminal in an embodiment of the present invention can receive the 3D video information sent by multiple session parties. The format of the video information may be left-eye image+right-eye image, left-eye image+depth/parallax information, or left-eye image+depth/parallax information+right-eye image residual information. The depth/parallax information is used because the depth/parallax information can be used to perform effective coding and decoding of the 3D video images; and the depth/parallax information can be used to reconstruct other virtual viewpoints effectively (namely, viewpoints where no physical cameras are placed).

In an embodiment of the present invention, the 3D video communication terminal may synthesize the video information of all session parties.

In a 3D video communication terminal system in an embodiment of the present invention, the video communication terminal may synthesize the video information of multiple session parties according to the display mode selected by the user or the pre-defined display mode. There are three display modes.

Mode 1: The terminal displays multiple session parties simultaneously in different modes, namely, displays the session party currently interacting with the terminal in a 3D display mode and displays other session parties in a 2D display mode.

Figure 3:
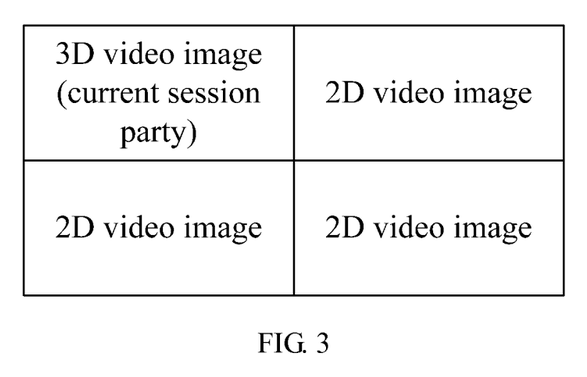
FIG. 3 shows the first 3D video communication display mode in an embodiment of the present invention.

As shown in FIG. 3, according to mode 1, the scene of the session party currently interacting with the terminal is displayed in a 3D way (the session party window on the upper left side of the screen), and other current session parties (to which the terminal pays less attention) are displayed in a 2D mode. In mode 1, the terminal user perceives the scene as if the user is on the spot.

In this embodiment, the terminal needs to detect all session parties to confirm the current session party. The current party may be a session party currently talking with the terminal user, or a session party specified by the terminal user. Besides, when the current session party of the terminal user changes, it is necessary to shift the mode of displaying the session parties in real time, namely, the terminal needs to determine the mode of displaying all session parties one by one. For brevity of description, this embodiment takes one session party of the terminal as an example to describe how the terminal confirms the mode of displaying the session party.

Figure 4:
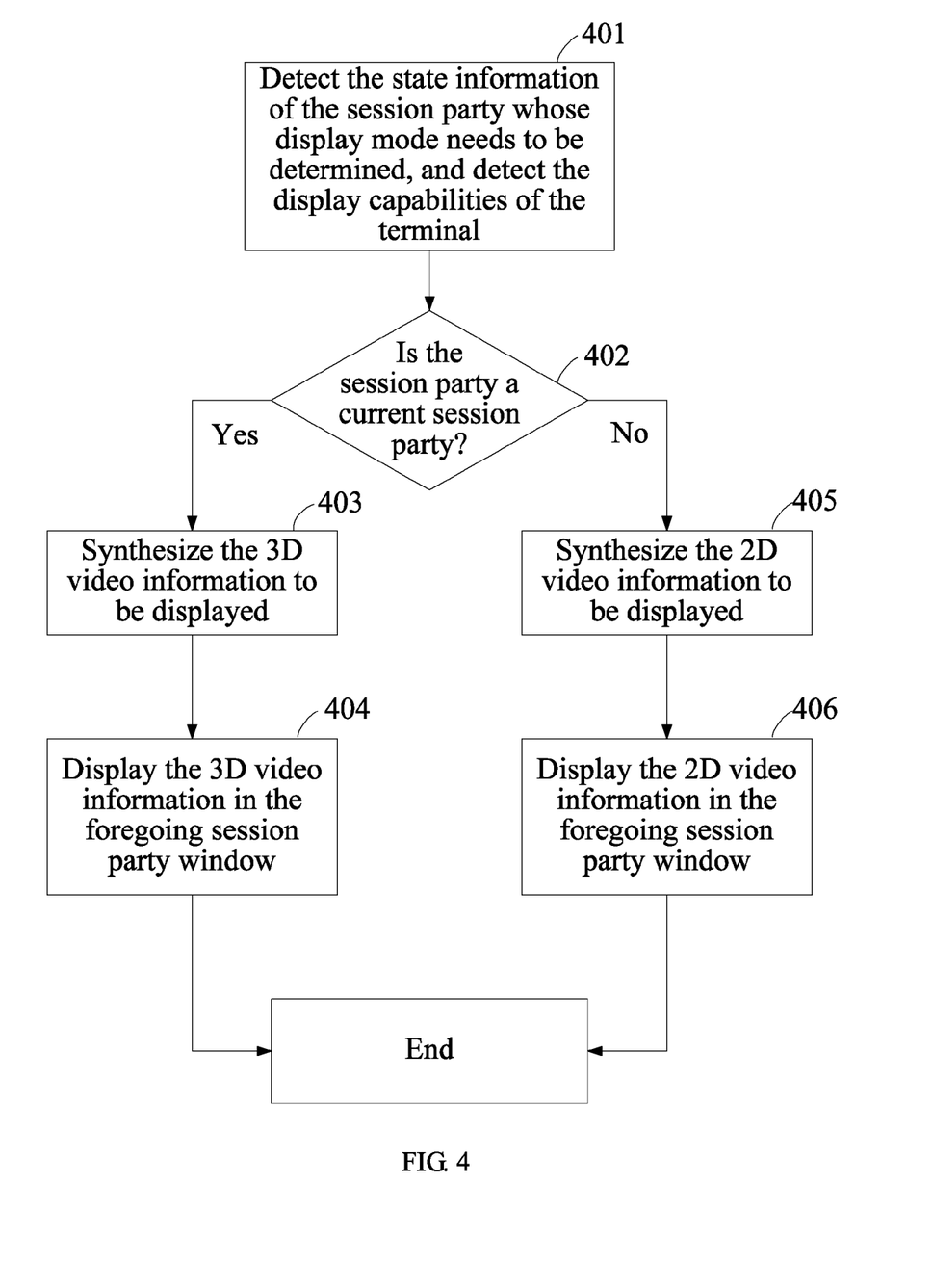
FIG. 4 is a flowchart of a method for a terminal to synthesize video information of all session parties in an embodiment of the present invention.

As shown in FIG. 4, the method for the terminal to synthesize video information of all session parties in this embodiment includes the following steps.

Step 401: Detect the state information of the session party whose display mode needs to be determined, and detect the display capabilities of the terminal.

In this step, the state information of the session party may include information indicating whether the session party is talking with the terminal, and the display capabilities of the terminal include information indicating whether the terminal supports the 3D display mode.

Step 402: Judge whether the session party is the current session party, and whether the terminal supports the 3D display mode. If such is the case, perform step 403; otherwise, perform step 405.

In this step, the criteria for judging the session party may be preset according to the actual conditions. For example, the terminal may take the session party currently talking with the terminal as the current session party according to the state information, or specify a session party as the current session party. If the terminal user specifies a session party as the current session party, the action of detecting the state information of the session party in step 401 is omissible.

Besides, in this step, it is necessary to judge whether the terminal supports the 3D display mode according to the display capabilities of the terminal.

Step 403: Synthesize the 3D video information to be displayed.

In this step, by using the 3D video information (for example, left-eye image+depth/parallax image) transmitted from the session party, multi-viewpoint images (for example, left-eye image and right-eye image) suitable for the watching position of the terminal user are obtained, or at least one viewpoint image and depth/parallax map is obtained, and the 3D image rendering is performed to synthesize the 3D view information for displaying.

Step 404: Displaying the 3D video information in the foregoing session party window. The process ends.

Step 405: Synthesize the 2D video information.

In this step, the foregoing session party is displayed through 2D video images. Therefore, it is necessary only to select one 2D video image (for example, either the left-eye image or the right-eye image) or synthesize one 2D video image (for example, a middle viewpoint image synthesized by using the left-eye image and the right-eye image) for rendering, and the 2D video information is generated.

Step 406: Display the 2D video information in the foregoing session party window. The process ends.

The terminal performs the foregoing processing for each session party confirms the display mode of each session party so that only the current session party is displayed in the 3D mode and other non-current session parties are displayed in the 2D mode.

Besides, in this embodiment, the terminal user may select a session party directly, and shift the multi-party display mode to the single-session display mode (for example, full screen display mode). As a result, the selected session party is displayed in the 3D or 2D mode automatically, and other session parties are not displayed. In this case, the selected session party may be the current session party or not.

In this embodiment, mode 1 may support two display modes.

(1) Display mode that involves a single stereoscopic display. In this display mode, a single stereoscopic display displays multiple session parties through multiple windows. In this display mode, each window uniquely corresponds to a session party. The current session party may be displayed through a 3D video window (namely, a window for displaying 3D video images), and other session parties may be displayed through a 2D video window (namely, a window for displaying 2D video images). Currently, many stereoscopic displays support flexible shift between the 2D display mode and the 3D display mode, for example, the stereoscopic display based on frame sequence, namely, the stereoscopic display employs the image buffering of left-eye image and right-eye image to implement stereoscopic display. Besides, the stereoscopic interface of the open graphic library (OpenGL) also supports display of the 3D video images in one window and display of 2D video images in other windows.

(2) Display mode that involves multiple displays. In this display mode, multiple displays are used to display multiple session parties, and each session party uniquely corresponds to a display. In such a display mode, the display corresponding to the current session party displays 3D video images, and the displays corresponding to other session parties display 2D video images.

Mode 2: The terminal displays multiple session parties simultaneously in the multi-party display mode, and the terminal user selects the display mode of each session party.

Figure 5:
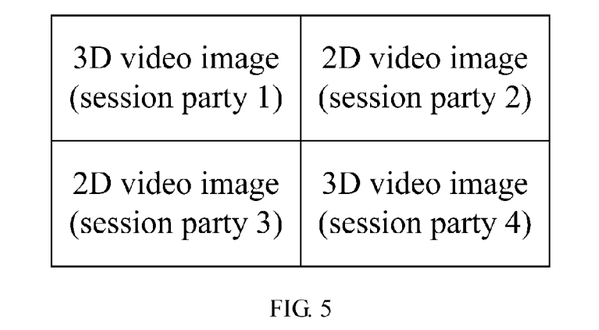
FIG. 5 shows the second 3D video communication display mode in an embodiment of the present invention.

As shown in FIG. 5, in mode 2, the terminal user can select the display mode of each session party according to the actual application conditions. That is, the terminal user may specify the display mode of each session party, and record the specified display mode of each session party in the state information of the session party. For example, the terminal user specifies the display mode of the parties to sessions 1 and 4 to be 3D display mode, and specifies the display mode of the parties to sessions 2 and 3 to be 2D display mode. In this case, the terminal may synthesize the video information of all session parties according to the display mode specified in the state information of each session party. That is, the terminal may synthesize one or more video streams simultaneously to obtain and display the 3D video images of one or more session parties. In this embodiment, the terminal synthesizes the video information of all session parties in the way similar to steps 401-406 in mode 1 and differs only in that in mode 2, the judgment conditions in step 402 are changed to judging whether the display mode of the foregoing session party is 3D display mode, or changed to judging whether the foregoing session party is a specified session party.

Besides, the terminal user may select a session party, and then shift the multi-party display mode to the single-session display mode to display the selected session party (namely, display the selected session party alone, without displaying other session parties). The single-session display mode may be 3D or 2D display mode. Like mode 1, mode 2 supports the display mode that involves a single stereoscopic display and the display mode that involves multiple displays. Besides, when synthesizing the 3D video images, mode 2 controls the parallaxes of the 3D images of each session party, thus preventing interference between the displayed 3D images and improving the user experience.

Mode 3: The terminal displays multiple session parties simultaneously in the multi-party display mode. All session parties are displayed in the 2D display mode, a session party may be selected to shift from the multi-party display mode to the single-session display mode (for example, full screen mode), and the selected session party is displayed in the 3D display mode.

Figure 6:
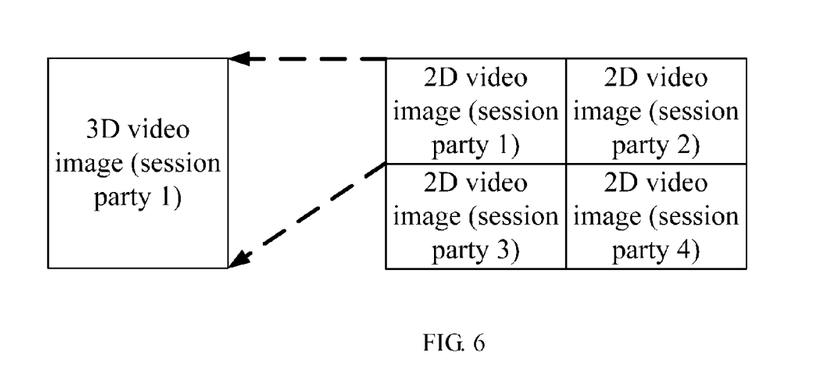
FIG. 6 is a flowchart of the third 3D video communication display mode in an embodiment of the present invention.

As shown in FIG. 6, in mode 3, for the devices that do not support simultaneous display of 2D images and 3D images but support a single session display mode (such as stereoscopic spectacles), the multi-party pictures are displayed in the 2D display mode. After the terminal user selects a session party (for example, session party 1), the information indicating that the session party serves as a selected session party is recorded in the state information of the selected session party, and the terminal may shift the selected session party to the full-screen single-session display mode according to the state information of the specified session party, and display the video images of the selected session party in the 3D display mode. Besides, in mode 3, when the selected session party is displayed in the single-session display mode, the terminal needs to synthesize the 3D video information for displaying according to the video information of the selected session party. When shifting back to the multi-picture display, the terminal needs to synthesize the 2D video information for displaying according to the video information of the selected session party. The method of the terminal synthesizing the video information of all session parties is the same as the synthesis method in mode 2, and is not repeated here any further.

Through the method for 3D video communication provided in this embodiment, the terminal capable of displaying 3D images receives video information of at least two session parties, and displays the video information received from each session party in a 3D or 2D way, thus implementing multi-party 3D video communication or 2D/3D hybrid multi-party video communication. Therefore, the user can perform 3D video communication with multiple session parties simultaneously, and obtain better experience in the 3D video communication.

In an embodiment of the present invention, an MCU may synthesize the video information of all session parties.

In the three display modes in the foregoing embodiments, the 3D video communication terminal synthesizes the video pictures of multiple session parties, and then processes the display mode of the session parties. In the following embodiment, an MCU capable of processing 3D video sessions and synthesizing 3D images is used to synthesize multi-party video pictures, and then send the synthesized video streams to the video communication terminal for displaying.

Figure 7:
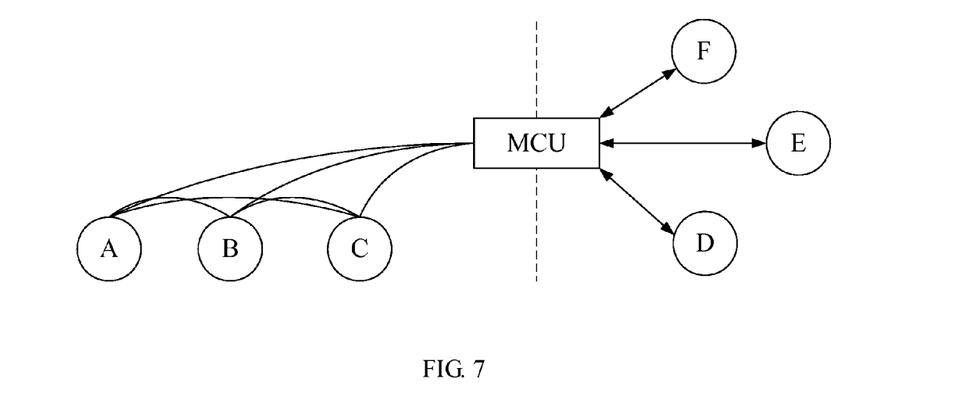
FIG. 7 shows a multi-point conference that employs an MCU in an embodiment of the present invention.

As shown in FIG. 7, in this embodiment, the communication network includes terminals A, B, and C capable of peer-to-peer communication, and includes the terminals D, E, and F incapable of peer-to-peer communication. Therefore, the MCU capable of processing 3D video sessions and synthesizing 3D images may be used to implement the multi-point conference, for example, terminal A performs a multi-point conference with terminals D, E, and F.

Figure 8:
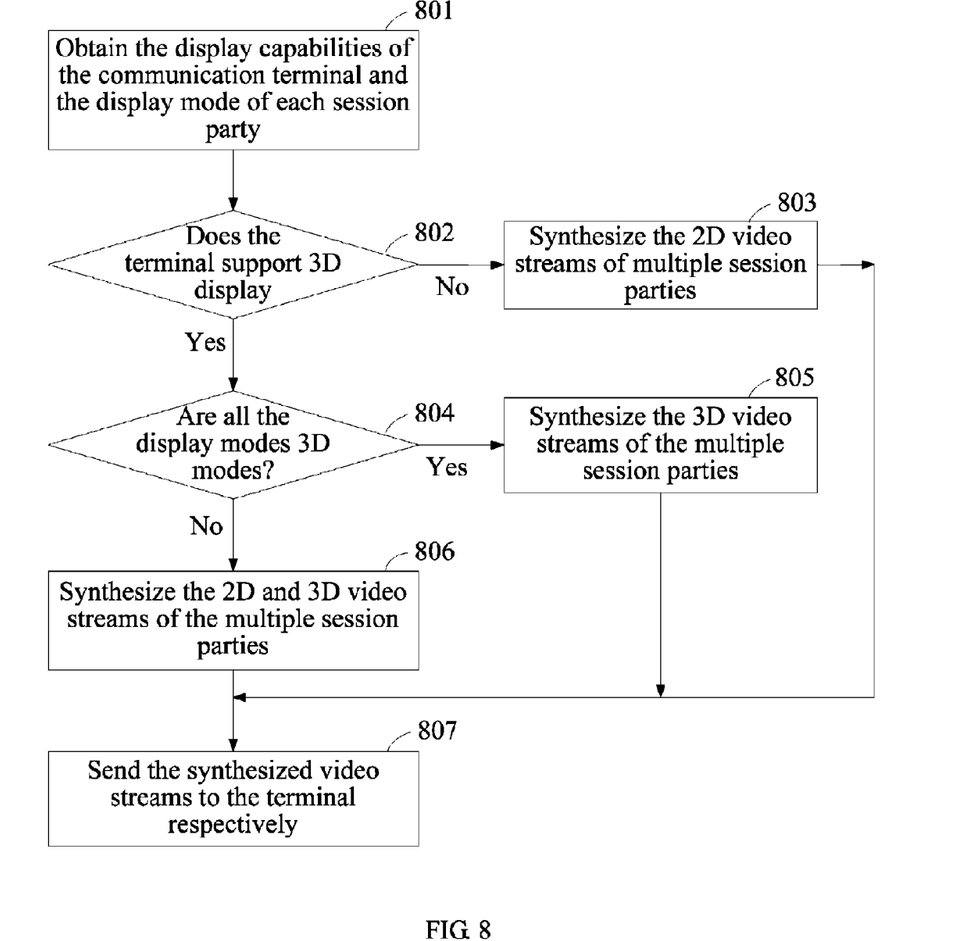
FIG. 8 is a flowchart of a method for using an MCU to implement 3D video communication in an embodiment of the present invention.

As shown in FIG. 8, the method for the MCU to implement the 3D video communication in this embodiment includes the following steps.

Step 801: Obtain the display capabilities of the communication terminal and the display mode of each session party.

In this step, the MCU needs to obtain the display capabilities of each communication terminal through a video communication protocol, and obtain the display mode of each session party according to the state information of each session party. The display capabilities of the communication terminal include whether the communication terminal is capable of capturing 3D videos, whether the communication terminal supports the 3D display mode, and whether the display mode of all session parties is the multi-party display mode. The session party state information may include information indicating whether the session party is a current session party, a specified session party, or a selected session party. The display mode of each session party can be obtained according to such information.

Step 802: Judge whether the terminal supports the 3D display mode. If the terminal supports the 3D display mode, perform step 804; otherwise, perform step 803.

Step 803: Synthesize the 2D video streams of the multiple session parties, and perform step 807.

In this step, because the terminal does not support the 3D display mode, the MCU synthesizes the video information of multiple session parties to be displayed by the current terminal into 2D video streams of multiple session parties.

Step 804: Judge whether the display mode of all session parties is the 3D display mode. If the display mode of all session parties is the 3D display mode, perform step 805; otherwise, perform step 806.

Step 805: Synthesize the 3D video streams of the multiple session parties, and perform step 807.

In this step, the MCU synthesizes the 3D video streams of multiple session parties according to the video information of all session parties. For example, the left-eye images of all session parties are synthesized into a frame of left-eye image, the depth/parallax images of all session parties are synthesized into a frame of depth/parallax images, and the frame of left-eye image and the frame of depth/parallax image are synthesized into the 3D video stream of multiple session parties.

Step 806: Synthesize the 2D and 3D video streams of the multiple session parties.

In this step, the MCU synthesizes the 2D or 3D video streams of multiple session parties according to the display capabilities and display mode of the terminal as well as the display mode of each session party. For example, the MCU synthesizes the left-eye images of all session parties into a frame of left-eye image, synthesizes the depth/parallax images of the selected session party (for example, the current session party which needs to be displayed in the 3D display mode, or the session party specified by the terminal user, or the session party selected by the terminal user) into a frame of depth/parallax image, synthesizes the frame of left-eye image and the frame of depth/disparity image into 3D video streams of multiple session parties, and synthesizes the video information of all unselected session parties (for example, 2D video information or left-eye image) into 2D video streams of multiple session parties.

Step 807: Send the synthesized video streams to the terminal respectively.

After step 807, the terminal synthesizes the video streams of all session parties for displaying according to the synthesized video streams received from the MCU.

Specifically, the terminal synthesizes the video streams of all session parties for displaying according to the received synthesized video streams received. For example, when the synthesized video streams received by the terminal are synthesized 2D video streams, the terminal splits the synthesized 2D video streams and synthesizes the 2D video information of each session party for displaying; when the synthesized video streams received by the terminal are synthesized 2D/3D video streams, the terminal splits the synthesized 2D/3D video streams and synthesizes the 2D video information of different session parties for displaying, or synthesizes the 3D video information for being displayed in the 3D mode (for example, combining a left-eye image in the synthesized video streams with the depth/parallax map corresponding to the left-eye image into a right-eye image corresponding to the left-eye image and forming 3D video information) and displays the information; when the synthesized video streams received by the terminal are synthesized 3D video streams, the terminal splits the synthesized 3D video streams and synthesizes the 3D video information of each session party for displaying (for example, combining a left-eye image in the synthesized image information with the depth/parallax map corresponding to the left-eye image into a right-eye image corresponding to the left-eye image and forming 3D video information) and displays the information.

Through the method for 3D video communication provided in the embodiments of the present invention, the terminal capable of displaying 3D images receives video information of at least two session parties, and displays the video information received from each session party in a 3D or 2D way, thus implementing multi-party 3D video communication or 2D/3D hybrid multi-party video communication. Therefore, the user can perform 3D video communication with multiple session parties simultaneously, and obtain better experience in the 3D video communication.

It is understandable to those skilled in the art that all or part of the steps of the foregoing method embodiments may be implemented by hardware instructed by a program. The program may be stored in a computer-readable storage medium. When being executed, the program performs steps of the foregoing method embodiments. The storage medium may be any medium suitable for storing program codes, for example, Read Only Memory (ROM), Random Access Memory (RAM), magnetic disk, or compact disk.

Figure 9:
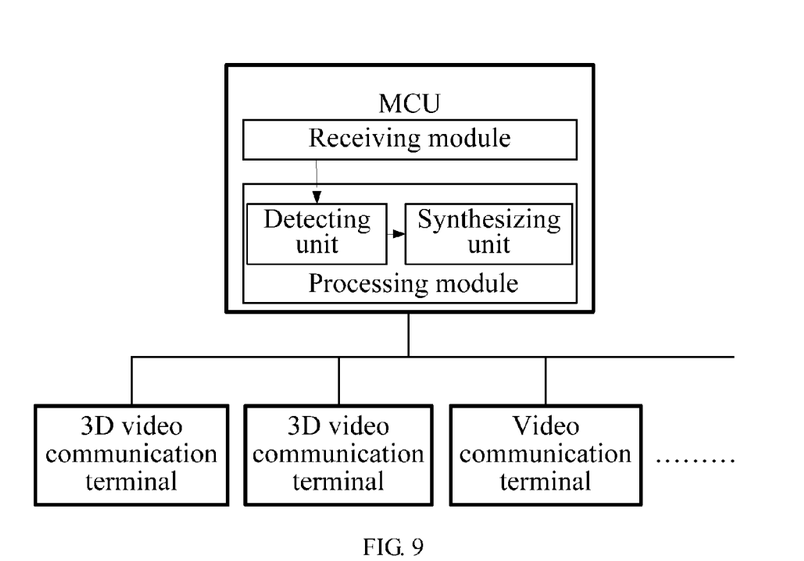
FIG. 9 shows a structure of a 3D video communication system in an embodiment of the present invention.

As shown in FIG. 9, the 3D video communication system in an embodiment of the present invention includes at least two video communication terminals, where at least one video communication terminal is a 3D video communication terminal capable of displaying 3D video information. FIG. 9 shows two video communication terminals capable of displaying 3D video information.

The system in an embodiment of the present invention includes an MCU that is configured to receive video information of at least two session parties, where the video information of at least one session party is 3D video information. The MCU is also configured to process the video information received from the at least two session parties according to state information of the at least two session parties and display capabilities of the terminal, and to obtain the processed video information. A video communication terminal is configured to obtain and display the processed video information.

In this system, all video communication terminals can perform multi-party video communications, and the video communication terminal capable of displaying 3D video information can receive video information from multiple session parties and display the received video information of all session parties simultaneously in the 3D or 2D mode.

The MCU in the system is configured to synthesize the video information of all session parties, and implement multi-party video communication between at least two terminals.

As shown in FIG. 9, the MCU further includes a receiving module that is configured to obtain video information and state information of at least two session parties as well as display capabilities of a terminal, where the video information of at least one session party is 3D video information. A processing module is configured to process the video information received from the at least two session parties according to the state information of the at least two session parties and the display capabilities of the terminal.

As shown in FIG. 9, the processing module may further include a detecting unit that is configured to detect the display mode of the session party according to the obtained state information of the session party. A synthesizing unit is configured to synthesize the 3D video streams of the session party according to the video information of the session party when the detecting unit determines that the display mode of the session party is a 3D display mode and the display capabilities of the terminal support 3D display. The synthesizing unit is also configured to synthesize the 2D video streams of the session party according to the video information of the session party when the detecting unit determines that the display mode of the session party is a 2D display mode.

Optionally, the detecting unit is configured to detect the display mode of the session party according to the obtained state information of the session party. The synthesizing unit is configured to synthesize the 3D video streams of the session party according to the video information of the session party when the detecting unit determines that the display mode of the session party is a 3D display mode and the display capabilities of the terminal support 3D display, and synthesize the 2D video streams of the session party according to the video information of the session party when the detecting unit determines that the display mode of the session party is a 2D display mode.

Besides, in another embodiment of the present invention, the foregoing 3D video communication system does not include the foregoing MCU. Instead, the 3D video communication terminal capable of displaying 3D video information synthesizes the video information of all session parties.

Figure 10:
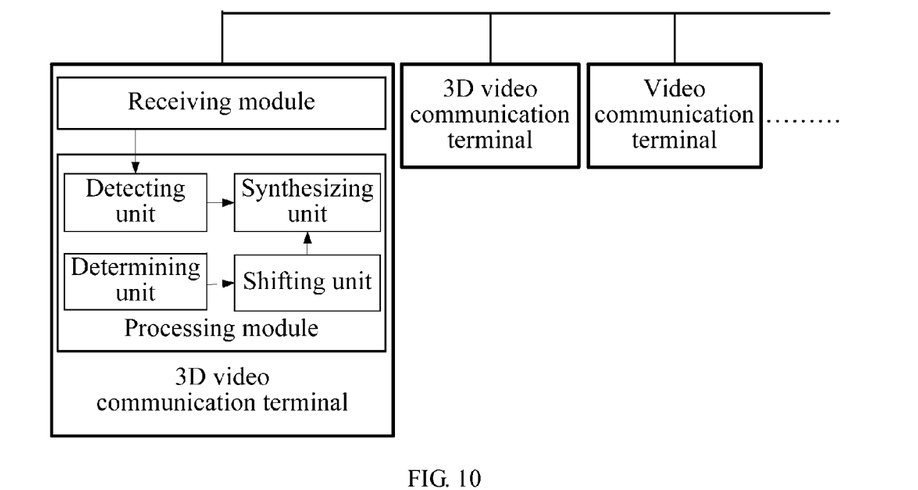
FIG. 10 shows a structure of another 3D video communication system in an embodiment of the present invention.

As shown in FIG. 10, the 3D video communication system in an embodiment of the present invention includes at least two session parties that are configured to send video information to the video communication terminal, where the video information of at least one session party is 3D video information. A video communication terminal is configured to receive video information of at least two session parties, and to process the video information received from the at least two session parties according to state information of the at least two session parties and display capabilities of the terminal.

The 3D video communication terminal shown in FIG. 10 may further include a receiving module that is configured to obtain video information and state information of at least two session parties as well as display capabilities of the terminal, where the video information of at least one session party is 3D video information. A processing module is configured to process the video information received from the at least two session parties according to the state information of the at least two session parties and the display capabilities of the terminal.

The processing module may further include a detecting unit that is configured to detect the display mode of the session party according to the obtained state information of the session party. A synthesizing unit is configured to synthesize the 3D video information of the session party according to the video information of the session party when the detecting unit determines that the display mode of the session party is a 3D display mode and the display capabilities of the terminal support 3D display. The synthesizing unit is also configured to synthesize the 2D video information of the session party according to the video information of the session party when the detecting unit determines that the display mode of the session party is a 2D display mode.

Optionally, as shown in FIG. 10, the processing module may further include a determining unit that is configured to determine the selected session party according to the selection instruction of the user. A shifting unit is configured to shift a multi-party display mode to a single-session display mode and to display the selected session party determined by the determining unit in the single-session display mode, where the selected session party is displayed in the 3D or 2D display mode.

Optionally, the detecting unit is configured to detect the display mode of the session party according to the obtained state information of the session party and detect whether the session party is the selected session party. The synthesizing unit is configured to synthesize the 3D video information for displaying according to the video information of the selected session party if the detecting unit determines that the session party is the selected session party, the display mode of the session party is a 3D display mode, and the display capabilities of the terminal support the single-session display mode. The synthesizing unit is also configured to synthesize the 2D video information to be displayed to the user according to the video information of each session party if the detecting unit determines that the session party is not the selected session party or the display mode of the session party is a 2D display mode.

In conclusion, through the method, apparatus, and system provided in the embodiments of the present invention, it is convenient to implement multi-party 3D video communication or 2D/3D hybrid multi-party video communication, and the user can perform 3D video communication with multiple session parties simultaneously and enjoy better experience of 3D video communication.

Described above are merely preferred embodiments of the present invention, but not intended to limit the scope of the present invention. Any modification, equivalent replacement, and improvement made without departing from the spirit and principle of the present invention fall within the scope of the present invention.

What is claimed is:

1. A three-dimensional (3D) video communication method, the method comprising:
   receiving video information of at least two session parties, wherein the video information of at least one session party is 3D video information; and
   processing the video information received from the at least two session parties according to state information of the at least two session parties and display capabilities of a terminal; and
   synthesizing the 3D video information or two-dimensional (2D) video information for displaying,
   wherein the steps of processing and synthesizing comprise:
   if the display capabilities of the terminal support the 3D display and the state information of each session party indicates that the display modes of the session parties are not all the 3D display mode, synthesizing single-viewpoint images of a same type in the video information of all the session parties into a frame of single-viewpoint image, synthesizing depth/parallax images of the session parties displayed in a 3D mode into a frame of depth/parallax image, and synthesizing the frame of single-viewpoint image and the frame of depth/parallax image into the 3D video streams, and synthesizing the video information of all the session parties displayed in a 2D mode into the 2D video streams;
   and sending the synthesized video streams to the corresponding terminal respectively.

2. The method of claim 1, wherein the steps of processing and synthesizing comprise:
   synthesizing the 3D video information for displaying according to video information of a current session party if the state information of the session party indicates that the session party is the current session party and the display capabilities of the terminal support a 3D display mode; otherwise, synthesizing two-dimensional (2D) video information for displaying according to the video information of the session party if the state information of the session party indicates that the session party is not the current session party or the display capabilities of the terminal do not support a 3D display mode.

3. The method of claim 1, wherein the steps of processing and synthesizing comprise:
   synthesizing the 3D video information for displaying according to video information of a specified session party if the state information of the session party indicates that the session party is the specified session party and the display capabilities of the terminal support a 3D display mode; otherwise, synthesizing two-dimensional (2D) video information for displaying according to the video information of the session party if the state information of the session party does not indicate that the session party is the specified session party or the display capabilities of the terminal do not support a 3D display mode.

4. The method of claim 2, further comprising:
   determining a selected session party according to a selection instruction of a user; and
   shifting a multi-party display mode to a single-session display mode and displaying the selected session party in the single-session display mode, wherein the selected session party is displayed in the 3D display mode or a 2D display mode.

5. The method of claim 3, further comprising:
   determining a selected session party according to a selection instruction of a user; and
   shifting a multi-party display mode to a single-session display mode and displaying the selected session party in the single-session display mode, wherein the selected session party is displayed in the 3D display mode or a 2D display mode.

6. The method of claim 1, wherein the steps of processing and synthesizing comprise:
   synthesizing the 3D video information for displaying according to video information of a selected session party if the display capabilities of the terminal support a single-session display mode and the state information of the session party indicates that the session party is the selected session party; otherwise, synthesizing two-dimensional (2D) video information for displaying according to the video information of each session party.

7. The method of claim 1, wherein the step of synthesizing comprises:
   obtaining image data comprising one of a multi-viewpoint image, at least one viewpoint image and a depth map, and at least one viewpoint image and a parallax map according to the video information of the session party, wherein the image data is suitable for a watching position, and synthesizing a 3D video signal by using the obtained image data.

8. The method of claim 1, wherein processing the video information comprises:
   synthesizing two-dimensional (2D) video information of each session party according to the video information of each session party if the display capabilities of the terminal do not support 3D display; and
   sending the synthesized video information to the corresponding terminal respectively.

9. A three-dimensional (3D) video communication apparatus, comprising:
   a receiving module, configured to obtain video information and state information of at least two session parties as well as display capabilities of a terminal, wherein the video information of at least one session party is 3D video information; and
   a processing module, configured to process the video information received from the at least two session parties according to the state information of the at least two session parties and the display capabilities of the terminal; and to synthesize the 3D video information or two-dimensional (2D) video information for displaying, wherein the processing module is further configured to:
   if the display capabilities of the terminal support the 3D display and the state information of each session party indicates that the display modes of the session parties are not all the 3D display mode, synthesize single-viewpoint images of a same type in the video information of all the session parties into a frame of single-viewpoint image, synthesize depth/parallax images of the session parties displayed in a 3D mode into a frame of depth/parallax image, and synthesize the frame of single-viewpoint image and the frame of depth/parallax image into the 3D video streams, and
   synthesize the video information of all the session parties displayed in a 2D mode into the 2D video streams;

and send the synthesized video streams to the corresponding terminal respectively.

10. The apparatus of claim 9, wherein the processing module comprises:
   a detecting unit, configured to detect a display mode of the session party according to the obtained state information of the session party; and
   a synthesizing unit, configured to synthesize the 3D video information of the session party according to the video information of the session party if the detecting unit determines that the display mode of the session party is a 3D display mode and the display capabilities of the terminal supports 3D display; and to synthesize two-dimensional (2D) video information of the session party according to the video information of the session party if the detecting unit determines that the display mode of the session party is a 2D display mode.

11. The apparatus of claim 10, wherein the processing module further comprises:
   a determining unit, configured to determine a selected session party according to a selection instruction of a user; and
   a shifting unit, configured to shift a multi-party display mode to a single-session display mode and display the selected session party determined by the determining unit in the single-session display mode, wherein the selected session party is displayed in the 3D or 2D display mode.

12. The apparatus of claim 9, wherein the processing module comprises:
   a detecting unit, configured to detect a display mode of the session party according to the obtained state information of the session party and detect whether the session party is a selected session party; and
   a synthesizing unit, configured to synthesize the 3D video information for displaying according to video information of the selected session party if the detecting unit determines that the session party is the selected session party, the display mode of the session party is a 3D display mode, and the display capabilities of the terminal support a single-session display mode; and to synthesize two-dimensional (2D) video information to be displayed to a user according to the video information of each session party if the detecting unit determines that the session party is not the selected session party or the display mode of the session party is a 2D display mode.

13. The apparatus of claim 9, wherein the apparatus is a Multi-point Control Unit (MCU) or video communication terminal.

14. A three-dimensional (3D) video communication system, comprising:
   at least two session parties, configured to send video information to a video communication terminal, wherein the video information of at least one session party is 3D video information; and
   a 3D video communication apparatus, configured to obtain video information and state information of the at least two session parties as well as display capabilities of the terminal,
   wherein the video information of at least one session party is 3D video information; process the video information received from the at least two session parties according to the state information of the at least two session parties and the display capabilities of the terminal; and
   synthesize the 3D video information or two-dimensional (2D) video information for displaying, wherein the synthesize comprises: if the display capabilities of the terminal support the 3D display and the state information of each session party indicates that the display modes of the session parties are not all the 3D display mode, synthesize single-viewpoint images of a same type in the video information of all the session parties into a frame of single-viewpoint image, synthesize depth/parallax images of the session parties displayed in a 3D mode into a frame of depth/parallax image, and synthesize the frame of single-viewpoint image and the frame of depth/parallax image into the 3D video streams, and synthesize the video information of all the session parties displayed in a 2D mode into the 2D video streams.

15. The system of claim 14, wherein the 3D video communication apparatus is a Multi-point Control Unit (MCU) or video communication terminal.

* * * * *